April 5, 1966   R. C. JOHNSON ETAL   3,244,480
SYNTHESIS OF FIBROUS SILICON NITRIDE
Filed March 3, 1964

INVENTORS
ROBERT C. JOHNSON
JOHN K. ALLEY
WILBUR H. WARWICK
HASKIEL R. SHELL

BY Ernest S. Cohen
William S. Brown
ATTORNEYS

# United States Patent Office 3,244,480
Patented Apr. 5, 1966

3,244,480
SYNTHESIS OF FIBROUS SILICON NITRIDE
Robert C. Johnson, Norris, John K. Alley and Wilbur H. Warwick, Andersonville, and Haskiel R. Shell, Norris, Tenn., assignors to the United States of America as represented by the Secretary of the Interior
Filed Mar. 3, 1964, Ser. No. 349,193
11 Claims. (Cl. 23—191)

The invention herein described and claimed may be manufactured and used by or for the Government of the United States of America for governmental purposes without the payment of royalties thereon or therefor.

This invention relates to preparation of silicon nitride ($Si_3N_4$) fibers.

FIGS. 1 and 2 illustrate the apparatus used in the method of the invention.

Fibrous $Si_3N_4$ has been previously noted to occur in small quantities as a by-product of granular silicon nitride production, usually by reacting silicon metal and nitrogen. Attempts to produce large quantities of fibers of suitable length by similar methods have failed.

$Si_3N_4$ fibers are useful for any application where high temperature fibers are needed. They have good oxidation resistance in air to about 1260° C. and in neutral or reducing atmospheres the fibers are stable at temperatures of 1800° C. or greater. Short fibers ($<¼''$) can be used to prepare felted insulating boards and sheets; fibers of $½''$ or longer would be necessary for weaving. The $Si_3N_4$ fibers find utility in reinforcement of ceramics or metals, in heat resistant clothing, and in thermally insulating boards, sheets or fillings.

It is accordingly an object of the present invention to provide a convenient and economical method for growing large quantities of $Si_3N_4$ fibers of suitable lengths.

It has now been found that this objective may be accomplished by reaction of silica or silicates with a reducing agent and nitrogen under suitable reaction conditions. It has been found that the reaction vessel employed in preparation of the $Si_3N_4$ fibers must provide a suitably large raw material surface area over and on which the fibers may grow. This has been found to be best accomplished by spreading out the mixture of raw materials in relatively thin layers. This provides maximum ease of and speeds up the rate of departure of Si vapor from the raw material mixture for reaction with the nitrogen to form the $Si_3N_4$ fibers outside the raw material mixture. An increase in the quantity of recoverable fibers of suitable length is produced thereby rather than premature fiber formation within the raw material mixture. An alternative method consists of spacing the reactants (silica material and reducing agent) apart to provide sufficient space for fiber formation.

The basic reaction mechanism involved in the process of the invention is believed to be represented by the following equations:

(1) 

(2) 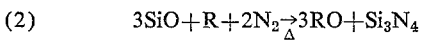

where R represents a reducing agent, [$SiO_2$] represents silica, per se or in the form of a silicate such as $Al_2Si_2O_7$, $Al_6Si_2O_{13}$, diatomaceous earth, wollastonite, magnesium silicate, pyrophyllite, kaolin, feldspar or silicic acid. Any silicate which will form thermally and chemically stable residual compounds as its $SiO_2$ content is reduced and removed will serve as a source of silicon for $Si_3N_4$ fiber formation in the process of the invention. Aluminum silicate and silica however, have been found to be particularly satisfactory raw materials for preparation of the $Si_3N_4$ fibers.

Although the optimum temperature will vary with reactants and the particular reaction vessel employed, temperatures of about 1300° C. to about 1500° C. are generally satisfactory.

The reducing agent reduces $SiO_2$ to SiO and then to Si which reacts with the $N_2$ to form $Si_3N_4$. Finely divided forms of carbon such as graphite or lampblack have been found satisfactory for use as the reducing agent; however, other conventional reducing agents such as silicon metal or aluminum metal may also be used. Furthermore, the graphite may be in the form of disk-like support members as described in Example 1 below.

Tank nitrogen was used as a source of nitrogen in the examples. The nitrogen source as well as the reaction vessel must, however, be maintained free of gaseous oxygen since the presence of such oxygen results in formation of $SiO_2$ in place of the desired $Si_3N_4$. Also $Si_3N_4$ will oxidize at operational temperatures (about 1300 to 1500° C.). Accordingly, graphite reaction vessels or graphite lined vessels are preferably used to prevent atmospheric oxygen from entering the reaction system through the crucible walls.

The specific preferred apparatus will be more fully described in the examples which follow.

EXAMPLE 1

Figure 1:
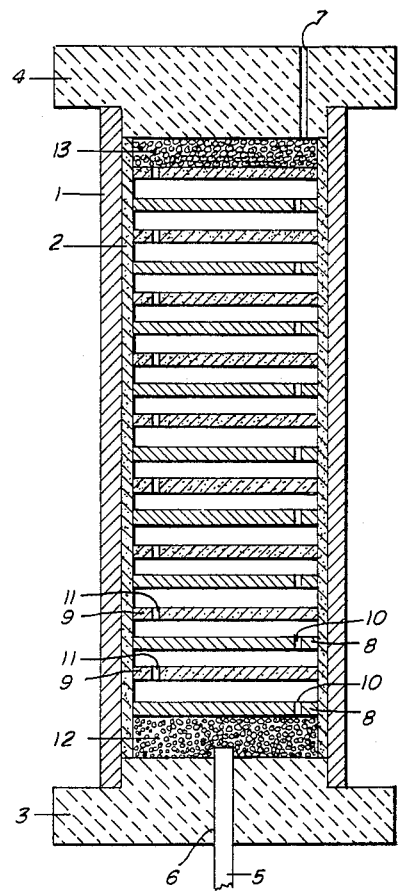
FIG. 1 is a view in section of one form of the apparatus.

The reaction vessel (crucible) employed in these examples is illustrated in FIG. 1 and comprises an Alundum tube 1 having a graphite lining 2. Aluminum silicate (firebrick) plugs 3 and 4 are used to close the ends of the tube. The $N_2$ inlet tube 5 is passed through a hole 6 in the bottom plug 3 while an exhaust hole 7 is drilled in top plug 7. Alternate disk-like support members of alumnum silicate (the bottom member is indicated by reference 8) and graphite reference 9 indicating the next succeeding member) are stacked and spaced in the graphite lined tube as shown in the figure. Holes 10, 11, etc., are also present in each disk to allow passage of gases through the crucible prior to exit through hole 7. This arrangement allows a large raw material (aluminum silicate and graphite) surface area over and on which the fibers can grow. This arrangement further provides a more even flow of gases through the system. The nitrogen gas entering through inlet tube 5 is dehydrated and deoxygenated by passing it through granular graphite 12 inside the crucible but separated from the raw materials. Similarly, free oxygen is prohibited from reaching the reactants near exit hole 7 by placing granular graphite 13 inside the crucible directly behind hole 7.

A silicon carbide rod resistance furnace, in which the atmosphere can be made non-oxidizing, is used to heat the above-described crucible. The crucible is set up in the furnace with the $N_2$ inlet tube extending through the bottom thereof and the nitrogen gas (from a $N_2$ tank via rubber tubing and a drying agent) turned on to flush the system before the furnace is turned on. With the $N_2$ gas still flowing the furnace temperature is raised slowly to about 500° C. to allow ample time for loss of absorbed volatiles and water to be driven off. A faster rate of temperature increase may be used above 500° C. The temperature was raised to 1400° C. in about 12 hours and held at this temperature for 6 hours. The furnace is then cut off and the nitrogen left flowing, until the furnace has cooled to about 500° C. A nitrogen flow rate of 6 liters per minute was used throughout the run. After the crucible has cooled to room temperature it is opened and the fibers removed. The heaviest growth of fibers was found near the center of the crucible.

EXAMPLE 2

The same furnace, crucible type, disk-like members, nitrogen flow rate and general firing procedure were used in this experiment as an Example 1 except that a 2 hour soaking period at 1400° C. was used instead of 6 hours.

This experiment further differed from that of Example 1 in that raw material mixtures (silica or silicate and reducing agent) as shown in the following table were spread in a thin layer over the horizontal refractory ($Al_2Si_2O_7$) or graphite disk-like members. Disk-like member number one (aluminum silicate) was at the bottom of the stack.

*Table 1*

| Disk No. | Raw material mixture | Resulting $Si_3N_4$ fiber growth on raw materials |
|---|---|---|
| 1 and 2 | 87 percent $Al_2Si_2O_7$, 13 percent lampblack | Good. |
| 3 | 60 mesh SiC | Fair. |
| 4 | 87 percent diatomaceous earth, 13 percent lampblack | Fair. |
| 6 | 87 percent wollastonite, 13 percent lampblack | Fair. |
| 7 | 87 percent $Al_2Si_2O_7$, 13 percent lampblack | Good. |
| 8 | 87 percent synthetic magnesium silicate, 13 percent lampblack. | Fair. |
| 9 | 87 percent pyrophyllite, 13 percent lampblack | Fair. |
| 10 | 87 percent kaolin, 13 percent lampblack | Good. |
| 11 | 87 percent feldspar, 13 percent lampblack | Fair. |
| 12 and 13 | 58 percent colloidal $SiO_2$, 27 percent Si metal, 15 percent lampblack. | Very good. |
| 14 | 57 percent silicic acid, 29 percent Si metal, 14 percent lampblack. Small amount of $Al_2O_3$, cement added as binder. | Good. |
| 15 and 16 | 19 percent colloidal $Al_2O_3$, 66 percent colloidal $SiO_2$, 15 percent lampblack. | Fair. |
| 17 and 18 | 85 percent colloidal $SiO_2$, 15 percent lampblack | Good. |
| 21 and 22 | 87 percent $Al_2Si_2O_7$, 13 percent lampblack, gum arabic added as binder. | Good. |
| 23 and 24 | 95 percent $Al_2Si_2O_7$, 5 percent lampblack, gum arabic used as binder. | Good. |
| 25 and 26 | 83 percent $Al_2Si_2O_7$, 17 percent lampblack, gum arabic used as binder. | Good. |
| 27 | Graphite disk | |

As is apparent from the above table, many silicates will serve as sources of silicon for $Si_3N_4$ fiber growth. However, $Al_2Si_2O_7$+lampblack, $SiO_2$+Si+lampblack and $SiO_2$+lampblack appear to give the best results.

EXAMPLE 3

Figure 2:
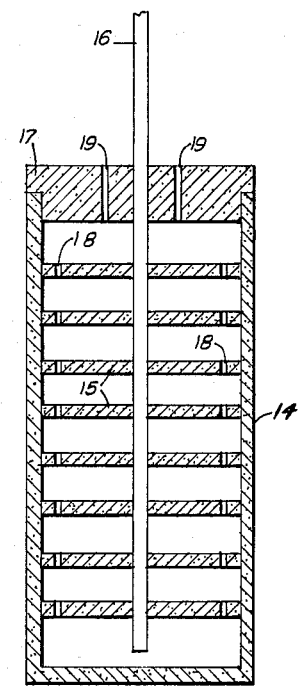
FIG. 2 is a view in section of another form of the apparatus.

In this example a crucible of the type shown in FIG. 2 was used. Both the crucible 14 and disk-like members 15 were of graphite. The $N_2$ inlet tube 16 (of Alundum) extended through the graphite lid 17 to the bottom of the crucible whereby $N_2$ flowed upward through the crucible by way of holes 18 drilled in the disk-like members and out through exit holes 19 in lid 17. An 85 percent $Al_2Si_2O_7$+15 percent lampblack mixture was used as raw material and was placed as a thin layer on all of the disk-like members. An $N_2$ flow rate of 6 liters per minute was used and firing time (in a graphite Arsem spiral resistance furnace) at 1400° C. was two hours. $Si_3N_4$ fiber yield on all but the top and bottom disk-like members was very good.

EXAMPLE 4

In this example pressed pellets of various materials were placed on the layers of 85 percent $Al_2Si_2O_7$+15 percent lampblack mixture as used in Example 3 to determine on what surfaces the $Si_3N_4$ fibers would grow and also to see which pellets would supply silicon for fiber growth. The crucible of Example 2 (FIG. 2) was used in the furnace of Example 3. Firing time at 1400° C. was 2 hours with a $N_2$ flow rate of 3 liters per minute. Fibers were found to grow on all the raw materials. Reactants and results are shown in the following table.

*Table 2*

| Pellet material | Remarks |
|---|---|
| SiO | Fibers grew on pellet. Served as silicon source. |
| $Al_2O_3$ | Fibers grew on pellet. |
| $SiO_2$ (tridymite) | Fibers grew on pellet. Served as silicon source. |
| $SiO_2$ (fused silica) | Do. |
| $Si_3N_4$ | Do. |
| $SiO_2$ (silicic acid) | Do. |
| Kaolin clay | Do. |

It will be evident from the above examples that the method of the invention provides a simple and inexpensive means for preparing $Si_3N_4$ fibers in large quantities and greater lengths than prior art processes. Such products are useful for a wide variety of applications where high temperature fibers are needed.

What is claimed is:

1. In a method for producing silicon nitride by reacting at an elevated temperature gaseous nitrogen with a silica material and a reducing agent capable of reducing the $SiO_2$ content in the silica material to elemental silicon, the improvement which comprises (a) maintaining thin layers of material containing said silica material and said reducing agent in a gaseous nitrogen environment during the reaction, which layers possess large surface areas, whereby vaporous silicon readily forms outside said layers and reacts with said gaseous nitrogen outside said layers to form silicon nitride fibers outside said layers, which fibers deposit on said large surface areas, and (b) removing the said deposited fibers from said large surface areas at the end of the reaction.

2. The method of claim 1 wherein said layers comprise a plurality of substantially parallel spaced-apart layers.

3. The method of claim 2 wherein each pair of immediately adjacent spaced-apart layers comprises a layer which contains only said silica material and a layer which contains only said reducing agent.

4. The method of claim 1 wherein said silica material is selected from the group consisting of silica and aluminum silicate.

5. The method of claim 4 wherein said reducing agent is selected from the group consisting of graphite and lampblack.

6. The method of claim 5 wherein the reaction temperature is about 1300° C. to 1500° C.

7. The method of claim 6 wherein the reaction temperature is about 1400° C.

8. A reaction vessel for forming silicon nitride fibers under elevated temperatures by reacting therein a silica material with gaseous nitrogen and a reducing agent capable of reducing, under elevated temperature, the $SiO_2$ content in said silica material to elemental silicon which comprises
(a) an elongated, substantially closed vessel,
(b) a stack of substantially parallel, spaced-apart, disk-like support members within said vessel, each member extending transversely across the interior of the vessel,
(c) each member capable of supporting thereon a mixture containing said silica material,
(d) each member containing an aperture therethrough to allow gaseous nitrogen and gaseous reaction products to pass through the vessel,
(e) the interior side of all of the walls of the vessel and each disk-like support member composed of said reducing agent,
(f) means to admit nitrogen to the interior of the vessel,
(g) means to remove gaseous reaction products from the interior of the vessel.

9. The reaction vessel of claim 7 wherein the reducing agent is selected from the group consisting of lampblack and graphite.

10. A reaction vessel for forming silicon nitride fibers under elevated temperatures by reacting therein a silica material with gaseous nitrogen and a reducing agent capable of reducing, under elevated temperatures, the $SiO_2$ content in said silica material to elemental silicon which comprises
(a) an elongated, substantially closed vessel,
(b) a stack of substantially parallel, spaced-apart, disk-like support members within said vessel, each member extending transversely across the interior of the vessel,
(c) each member capable of supporting thereon a mixture containing said silica compound,
(d) each member containing an aperture therethrough to allow gaseous nitrogen and gaseous reaction products to pass through the vessel,
(e) the interior side of the walls of the vessel and every other disk-like member in the stack composed of said reducing agent,
(f) the remaining disk-like members composed of a silica material selected from the group consisting of silica and inorganic silicates capable of forming thermally and chemically stable residual compounds as the $SiO_2$ content of the inorganic silicate is reduced and removed from the silicate during reaction in the vessel under elevated temperatures,
(g) means to admit nitrogen to the vessel,
(h) means to remove gaseous reaction products from the vessel,
(i) means disposed in said nitrogen admitting means and disposed in said removing means to prevent the entry of oxygen to the interior of the vessel.

11. The reaction vessel of claim 10 wherein the reducing agent is selected from the group consisting of graphite and lampblack and wherein said oxygen prevention means comprises granular graphite.

References Cited by the Examiner

UNITED STATES PATENTS

| | | | |
|---|---|---|---|
| 1,518,043 | 12/1924 | Audianne et al. | 23—175 |
| 1,874,735 | 8/1932 | Barstow et al. | 23—1 |
| 2,410,043 | 10/1946 | Breton et al. | 23—205 X |

FOREIGN PATENTS

| | | |
|---|---|---|
| 15,641 | of 1909 | Great Britain. |
| 25,141 | of 1911 | Great Britain. |

OSCAR R. VERTIZ, *Primary Examiner.*

MAURICE A. BRINDISI, *Examiner.*

J. J. BROWN, *Assistant Examiner.*